United States Patent
Beneke

(10) Patent No.: US 6,865,287 B1
(45) Date of Patent: Mar. 8, 2005

(54) METHOD FOR ADJUSTING COLOR IN AN IMAGE

(75) Inventor: Knut Beneke, Ober-Olm (DE)

(73) Assignee: Heimann Systems GmbH, Wiesbaden (DE)

( * ) Notice: Subject to any disclaimer, the term of this patent is extended or adjusted under 35 U.S.C. 154(b) by 0 days.

(21) Appl. No.: 09/657,505

(22) Filed: Sep. 8, 2000

(30) Foreign Application Priority Data

Sep. 9, 1999 (DE) .......................................... 199 43 183

(51) Int. Cl.⁷ .............................. G06K 9/00; H05G 1/64
(52) U.S. Cl. ........................ 382/132; 382/162; 382/167; 378/98
(58) Field of Search .............................. 382/132, 162, 382/167, 128; 378/98–98.12, 46, 62, 89, 90, 98.9

(56) References Cited

U.S. PATENT DOCUMENTS

| | | | |
|---|---|---|---|
| 3,848,130 A | * 11/1974 | Macovski | 378/98.9 |
| 4,987,584 A | 1/1991 | Doenges | 378/100 |
| 5,253,283 A | 10/1993 | Annis et al. | 378/100 |
| 5,422,739 A | * 6/1995 | Usami et al. | 358/518 |
| 5,600,303 A | 2/1997 | Husseiny et al. | 340/568 |
| 6,546,072 B1 | * 4/2003 | Chalmers | 378/57 |
| 6,567,496 B1 | * 5/2003 | Sychev | 378/57 |

FOREIGN PATENT DOCUMENTS

| | | |
|---|---|---|
| EP | B1-0523898 | 5/1999 |
| EP | B1-0584690 | 5/1999 |
| EP | B1-0758514 | 5/1999 |

* cited by examiner

*Primary Examiner*—Leo Boudreau
*Assistant Examiner*—Tom Y. Lu
(74) *Attorney, Agent, or Firm*—Birch, Stewart, Kolasch & Birch, LLP.

(57) ABSTRACT

In the representation of X-ray images, an atomic number characteristic for an X-rayed sub-object (2, 3, 4) is determined from X-ray beams having different energies and the absorption values determined in that process, to which specific colors and shades are assigned. The representation of the color intensity is influenced so that, when representing objects (3, 4) having the same X-ray absorption on a monitor (8), the colors appear equally bright to the viewer. To that end, while the pre-set color for the objects (3, 4) is maintained, the brightness of the different colors is adjusted to an equal or approximately equal brightness, taking into account the spectral sensitivity of the human eye.

10 Claims, 1 Drawing Sheet

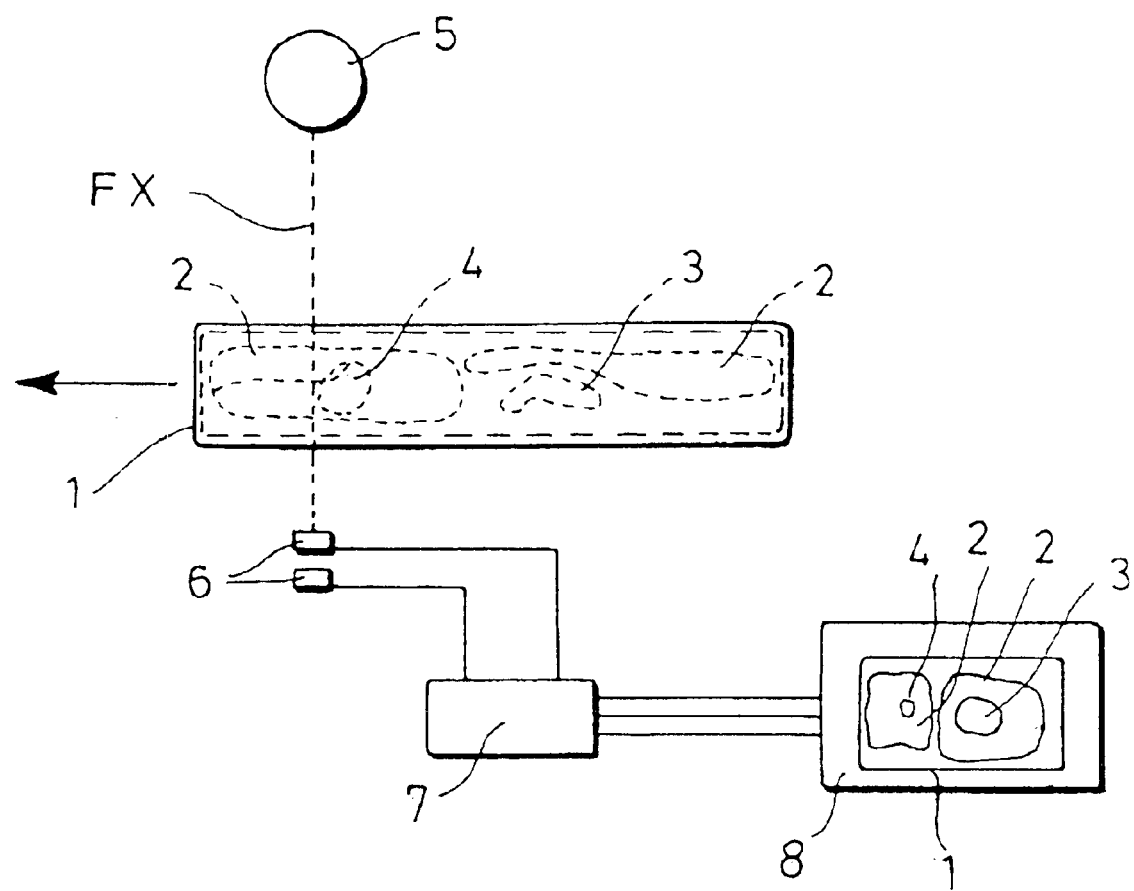

METHOD FOR ADJUSTING COLOR IN AN IMAGE

BACKGROUND OF THE INVENTION

This application claims priority based on German application 199 43 183.3, filed Sep. 9, 1999 and the contents thereof are incorporated herein by reference.

1. Field of the Invention

The present invention relates to methods for adjusting color in an image, more particularly, to adjusting color in an X-ray image.

2. Background Art

In the radioscopy of objects, sub-objects are represented by varying brightness levels in accordance with their X-ray absorption (grayscale image). In films, high-absorbing objects/sub-objects are represented as light images, while low-absorbing objects/sub-objects produce significant darkening and are therefore represented as darker images. In electronic image processing, using reverse imaging is also customary, i.e. light grayscale values are used for objects/sub-objects having weak X-ray absorption.

The objects/sub-objects may be X-rayed using varied energy levels to provide improved identification of the material(s) that the objects/sub-objects are made from. The type materials of the X-rayed objects or sub-objects may be determined from absorption values determinable at the different energy levels.

For visual determination of the objects'/sub-objects' materials, the materials of the objects/sub-objects may be represented by different colors. For example, a color is assigned to an average atomic number that defines a specific material type. This produces a so-called false-color-image for the human eye, made up of two specific types of information: absorption and material.

Accordingly, if two materials having identical absorption (brightness), but are made from different materials (color), are compared to this false-color-image, the two material appear to have different brightness levels to the human eye, since the human eye has different sensitivity to different colors. Therefore, a green object is perceived to be much brighter than a blue object. This results in the conclusion that the blue object is subject to a higher absorption than the green one, because the human eye is especially sensitive to green, and on the contrary, is insensitive to blue. This leads to unpleasant visual strain for a person viewing the image and to poor discernability of objects represented by darker colors. The latter is particularly important when analyzing an X-ray image, because here indeed is where superimposed sub-objects in the image must be discernable as shadings lying one behind another.

European patent documents EP 0 523 898 B1, EP 0 584 690 B1, and EP 0 758 514 B disclose devices and processes that improve color images in the television and video sector, taking into account the three primary colors—red, green, and blue—according to the NTSC (National Television System Committee) standard.

SUMMARY OF THE INVENTION

It is an object of the invention to regenerate and optimize a color image viewed by the human eye, specifically an X-ray image, so that the observer is subjected to less visual strain and the discernability of sub-objects is improved.

This and other objects of the present invention are achieved by providing a method for adjusting colors of an image, in particular of an X-ray image, in which an object having sub-objects shown in different colors is depicted. The steps of the method include determining an absorption attribute of a plurality of the sub-objects, assigning a specific color to each of the plurality of sub-objects having a same absorption attribute, each specific colors being different from each other, adjusting a brightness level of one of the specific colors by adjusting each pixel thereof with a determined color proportion of at least one of red, green or blue, whereby the adjustment of the brightness level takes into consideration the sensitivity of the human eye, and displaying at least the plurality of sub-objects having the same absorption attributes on a monitor, whereby adjustment of the brightness level of one of the specific colors causes the human eye to view at least the plurality of sub-objects as having equal brightness levels.

The present invention is based on the idea of adapting the representation of different colors to the viewing behavior of the human eye, so that the different colors at the same X-ray absorption are represented with the same degree of brightness to the human eye. The same degree of brightness thus means that after adapting the colors to the spectral sensitivity curve of the eye, the observer has the impression that the colors are equally bright.

In addition, it is also advantageous that smaller areas having a lower degree of brightness are also quickly discerned by the viewer, since they are more quickly perceived by the human eye after the brightness is adjusted.

Red, Green and Blue (RGB) values calculated for the adaptation are stored in support tables of a computer or processor, which is accessed for representation of colors on a display device or monitor. Therefore, a brightness specification and a present color value are input into the computer, as a result of which the RGB values previously calculated and stored for the input brightness and special color value are taken from the support tables.

Further scope of applicability of the present invention will become apparent from the detailed description given hereinafter. However, it should be understood that the detailed description and specific examples, while indicating preferred embodiments of the invention are given by way of illustration only, since various changes and modifications within the sprit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not imitative of the present invention, and wherein:

FIG. 1 is a block diagram illustrating various elemental features according to an embodiment of the present invention.

DETAILED DESCRIPTION OF THE PREFERRED EMBODIMENT

FIG. 1 is a block diagram illustrating various elemental features according to an embodiment of the present invention. Although elements according to the drawing will be discussed in detail they are not to be construed as limiting of the claimed invention, as it is understood by those skilled in the art that various modifications and/or additions may be made to the illustrated elements and such are embraced by the scope of the hereinafter set forth claims.

Referring to FIG. 1, as illustrated an object 1, containing several sub-objects 2, 3, 4, is moved through a plurality of X-ray beams FX (may also be just one X-ray beam) via a conveyor (not shown in detail) or the like. The X-ray beams FX are generated by an X-ray beam source 5.

The sub-object 2, for example, is made of an organic material (clothing or the like) having an average thickness. The sub-object 3, for example, is made of iron having a thickness of 3 mm. The sub-object 4 is (pure) aluminum having a thickness of 20 mm. The sub-objects 2, 3 and 4 absorb the X-ray beams FX in different ways, whereby the sub-objects 3 and 4 generate identical absorption values despite their differing thickness in the example.

The absorption of the X-ray beams FX is measured via detectors 6 and input into a computer or processor 7 for evaluation and processing. In the computer 7, the absorption values are converted for grayscale imaging in a known manner. With the aid of the grayscale image, the absorption behavior, particularly of the sub-objects 2, 3, and 4, is depicted on a monitor 8. In this grayscale image on the monitor 8, brightness levels that differ among the sub-objects 2 and 3, or 2 and 4, and that are identical between sub-objects 3 and 4, are discerned by the human eye of a viewer (not shown in further detail).

In order to provide a visual representation of the materials of the sub-objects 2, 3 and 4 themselves, a signal for absorption in the high-energy range of the X-ray spectrum and a separate signal for absorption in the low-energy range are measured from the detectors 6 in a known manner using the two-energy process (not shown in further detail here for the sake of clarity). From these two signals, the average atomic number of the sub-objects 2, 3 and 4 is determined in the computer 7. Using the average atomic number of each sub-object 2, 3 and 4 a display color is assigned to each of the sub-objects. For example, the color orange is assigned to organic materials having a low average atomic number, the color green is assigned to aluminum that has a higher average atomic number, and the color blue is assigned to iron and steel, which have even higher average atomic numbers. These shades are depicted dark or bright depending on material thickness or material density. This means that the density or the thickness of the sub-objects 2, 3 and 4 determine the apparent brightness of the respective color or respective shade thereof.

The sub-object 2 is thus depicted in a color image (false-color-image), for example, as bright orange. In a color image of this type, the sub-object 3 would then be depicted as a dark blue and the sub-object 4 would be depicted as a strong green (if the sub-object 4 were thinner, it would be depicted as a light green).

Accordingly, especially in the representation of the materials of the sub-object 3 and the sub-object 4, different perceived color intensities with regard to the brightness of the color or the shade appear. While the sub-object 3 and the sub-object 4 appeared equally bright in known grayscale imaging because the two have the same absorption, the impression is now different in the color image because the sub-object 3 is depicted in the color blue and the sub-object 4 is depicted in green, whereby the color green is perceived to be much brighter by the human eye than the color blue.

To avoid this, a color adjustment for the human eye of the entire color image and of parts of the color image is now performed based on the three-color theory.

For the sake of clarity, the sub-object 2 is not taken into consideration in the following description.

In the color image representation, the sub-objects 3 and 4, which appear equally bright due to their having identical absorption properties, are preferably adjusted to the same or approximately the same brightness. This is done in accordance with the known formula (according to Grassmann):

$$Y=0.299*R+0.587*G+0.114*B$$

where Y is the brightness, R is the primary color red, G is the primary color green, and B is the primary color blue, which are thus the RGB values of a color pixel. The quantities R, G, B and Y may range in value from 0.000 to 1.000.

To obtain an approximately equal brightness Y for all color pixels, in particular, those with the same absorption values, the color proportion R, G, B for each pixel is calculated, which must be adjusted or added for increasing the intensity, as is described hereinbelow.

The two sub-objects 3 and 4 have an identical absorption of 60%, for example, but each have a different thickness. A brightness of Y=4.0 results in a known manner from the absorption of 60%.

Due to the average atomic number, the sub-object 4 is depicted in a green shade. Assuming the material is pure aluminum, this yields the following RGB-values: 0.000/0.681/0.000, since no red and no blue are present in the pure green shade (0.587*0.681=0.4).

The sub-object 3 is represented in blue due to its average atomic number. Following the discussion hereinabove, the RGB values are: 0.000/0.000/3.509, thereby resulting in a blue shade (0.114*3.509=0.4).

Therefore, according to the above calculations, the brightness $Y_G$ for green is approximately equal to the brightness $Y_B$ for blue, i.e. $Y_G=0.4=Y_B$.

RGB values over 1.000 are not possible.

Therefore, with the addition of red and/or green and taking the color theory into consideration, the brightness of the sub-object 3 is adjusted in a manner visually perceptible to the eye, in this case a brightening of the shade of blue, since blue is darker than green. This brightening is done preferably so that red and green values share in equal proportion in the RGB value of the blue color.

Accordingly the necessary RGB value is calculated as follows:

$$Y=0.4=0.299*0.323+0.587*0.323+0.114*1.000,\ i.e.\ RGB=0.323/0.323/1.000.$$

With this process, to the human eye, the sub-object 3 is depicted as a blue equal in brightness to the green of the sub-object 4. This process can also be applied in an analogous manner to secondary colors.

The intensity of the green color can also be reduced, if this helps provide uniform observation for the viewer. In this process, it is not the brightness of the green color that is decisive, but rather the brightness of another reference color.

In practice, tables for brightness adjustment are stored in the computer 7. For a brightness adjustment to be performed for each color, these tables contain the corresponding color values or RGB values to be re-regulated, which are pre-calculated as described and then accessed during the color image display on the monitor 8. Accordingly, the brightness specification and the present color value are input into the tables of the computer 7. The color control of the monitor 8 is then handled via three outputs for color image representation, now consisting of the newly calculated RGB values.

It is understood that this process is not limited to representation of X-ray images. Thus, brightness adjustment for the human eye can also be used in the video and television sector.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for adjusting colors of an image, in particular of an X-ray image in which an object having sub-objects shown in different colors is depicted, comprising the steps of:

determining an X-ray absorption attribute of a plurality of the sub-objects;

assigning a specific color to each of the plurality of sub-objects on the basis of an average atomic number;

adjusting a brightness level of one of the specific colors by adjusting each pixel thereof with a determined color proportion of at least one of red, green or blue, whereby the adjustment of the brightness level takes into consideration the sensitivity of the human eye; and displaying at least the plurality of sub-objects having the same X-ray absorption attributes on a monitor, whereby adjustment of the brightness level of one of the specific colors causes the human eye to view at least the plurality of sub-objects as having equal brightness levels, wherein the brightness level of at least one of the specific colors, which is assigned to a sub-object, is adjusted if the X-ray absorption attribute associated with the sub-object is substantially equal to the X-ray absorption attribute of another sub-object.

2. The method according to claim 1, wherein color proportions are stored in support tables of a computer.

3. The method according to claim 1, wherein the intensity of the specific colors is increased or decreased for the brightness adjustment.

4. The method according to claim 1, wherein prior to the adjusting step, the method further comprises:

determining one average atomic number of each of the plurality of sub-objects from two different energies; and assigning the specific colors to the plurality of sub-objects based upon their respective average atomic number.

5. The method according to claim 1, wherein the brightness level of a plurality of the specific colors, which are assigned to their respective sub-objects, are adjusted if the X-ray absorption attribute associated with the sub-objects are substantially equal to the X-ray absorption attribute of another sub-object.

6. An X-ray apparatus comprising:

an X-ray beam source for producing an X-ray beam that is transmitted through an object, the object containing a plurality of sub-objects;

a detector for detecting the X-ray beam;

an evaluation unit for evaluating the detected X-ray beam and determining absorption values and an average atomic number for each of the sub-objects being contained in the object, the evaluation unit further assigning a specific color to each of the sub-objects on the basis of the average atomic number and assigning a brightness level to each of the sub-objects on the basis of the absorption values; and a display unit for displaying each of the sub-objects and their associated specific color and brightness level, wherein the brightness level of a sub-object is adjusted if the absorption value of the sub-object is substantially equal to the absorption value of another sub-object.

7. The X-ray apparatus according to claim 6, wherein the absorption values include an absorption value in a high-energy range and an absorption value in a low-energy range of the X-ray spectrum.

8. The X-ray apparatus according to claim 6, wherein the brightness level of the sub-object is adjusted such so that a perceived brightness level of the sub-object is substantially similar to the brightness level of the sub-object having the substantially equal absorption value.

9. A method for adjusting colors of an X-ray image, the method comprising:

producing an X-ray beam that is transmitted through an object, the object containing a plurality of sub-objects;

detecting the X-ray beam;

determining absorption values and an average atomic number for each of the sub-objects on the basis of the detected X-ray beam transmitted through the object;

assigning a specific color to each of the sub-objects on the basis of the average atomic number;

assigning a brightness level to each of the sub-objects on the basis of the absorption values; and adjusting the brightness level of a sub-object if the absorption value of the sub-object is substantially equal to the absorption value of another sub-object.

10. The method according to claim 9, wherein the brightness level of the sub-object is adjusted such so that a perceived brightness level of the sub-object is substantially similar to the brightness level of the sub-object having the substantially equal absorption value.

* * * * *